Feb. 23, 1932.                 M. M. EATON                 1,846,999
       APPARATUS FOR USE IN THE MANUFACTURE OF MOLDED ARTICLES
            FROM SYNTHETIC RESINS AND OTHER MOLDABLE MATERIALS
                         Filed Oct. 10, 1931

Patented Feb. 23, 1932

1,846,999

UNITED STATES PATENT OFFICE

MAURICE MICHAEL EATON, OF EDGBASTON, BIRMINGHAM, ENGLAND, ASSIGNOR, BY DIRECT AND MESNE ASSIGNMENTS, TO CROWN CORK & SEAL COMPANY, INC., OF BALTIMORE, MARYLAND, A CORPORATION OF NEW YORK

APPARATUS FOR USE IN THE MANUFACTURE OF MOLDED ARTICLES FROM SYNTHETIC RESINS AND OTHER MOLDABLE MATERIALS

Application filed October 10, 1931, Serial No. 568,128, and in Great Britain March 20, 1930.

This invention relates to apparatus for use in producing molded articles from synthetic resins and other moldable materials which are initially in the form of powder, grain or pellets and are capable of taking the shape of a mold under the action of heat and pressure.

More particularly stated the invention is concerned with apparatus of the kind comprising a rotary carrier, a plurality of co-operating molds and plungers mounted on said carrier, means for feeding the material to the molds and means for displacing the plungers relatively to the filled molds in order to subject the material therein to pressure.

In such apparatus the molds have been locally and individually heated as by the use of electrical heating elements but this method of localized heating presents many disadvantages, such as: high initial cost of the apparatus, due to its complicated construction, difficulty in controlling the temperature of the individually heated parts and non-uniform expansion of the heated and unheated parts of the mechanism with the consequent risk of distortion and loss of accuracy in the articles being produced.

According to the present invention, however, the principal parts of the operating mechanism, comprising the rotary carrier and its molds and plungers, are enclosed in a suitable chamber within which a substantially uniform elevated temperature is maintained.

This arrangement ensures a much simplified construction and an accurately controllable and uniform heating of all the molds as well as of the remaining parts of the enclosed mechanism, whereby non-uniform expansion of the parts is prevented. The maintenance of an elevated temperature within the chamber may be effected by heating the latter either internally or externally by means of steam, gas, electric heaters or the like and, in some cases, heating elements may be arranged within the walls of the chamber. It will be understood that a combination of two or more of these heating arrangements may be employed if desired.

In the accompanying drawings:—

Figure 1:
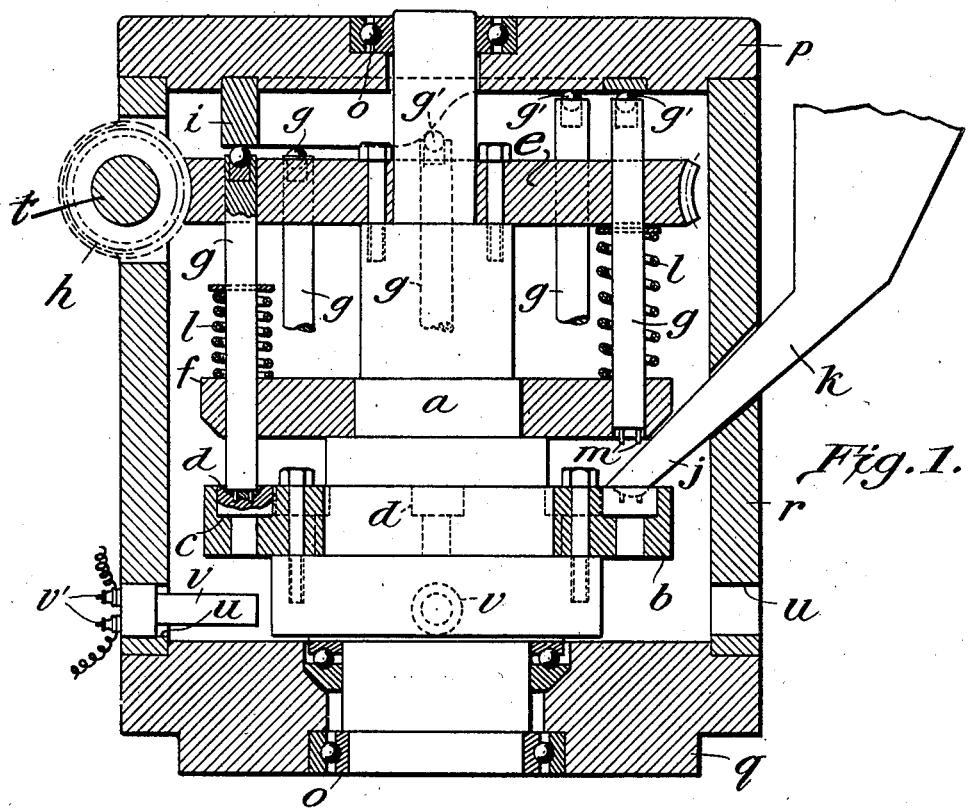

Fig. 1 is a vertical section and

Figure 2:
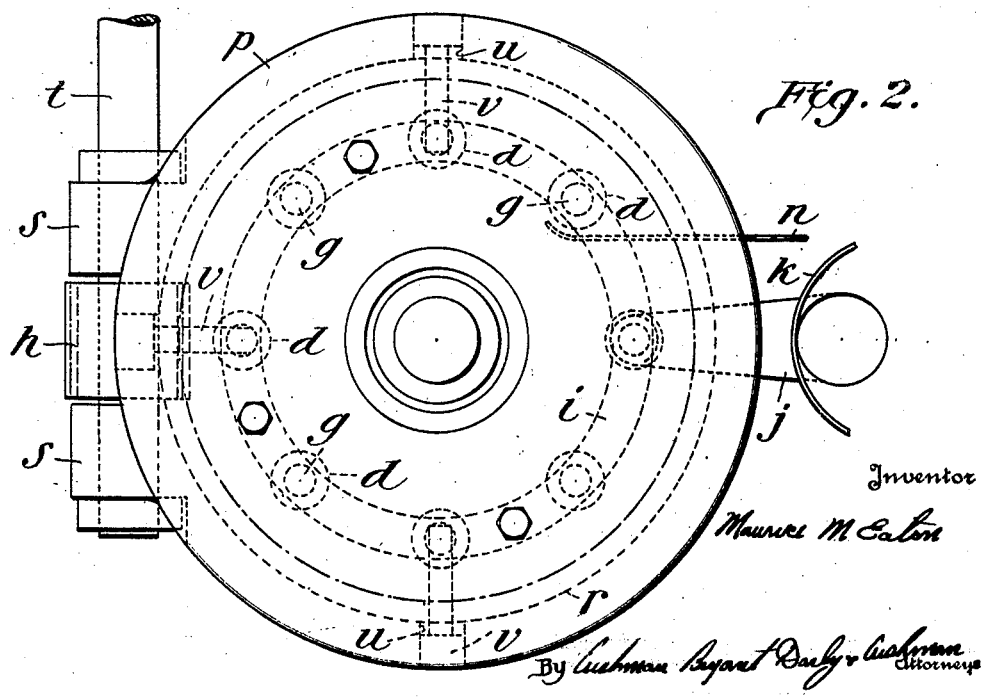

Fig. 2 a plan showing, somewhat diagrammatically, a machine according to this invention for molding small articles such as buttons.

As is usual in such machines, a stepped vertical shaft $a$ has secured thereon near its lower end a horizontal table $b$ in the upper surface of which are formed a plurality of recesses $c$ each receiving a mold $d$ of suitable shape. Upper and lower supports $e$ and $f$ mounted on the shaft $a$ serve to guide in a vertical direction reciprocable plungers $g$ each co-operating with one of the molds $d$ and the shaft $a$ is rotated by means of a worm $h$ gearing with a worm wheel on the periphery of the upper support $e$. During the rotation of the shaft $a$ the upper ends of the plungers $g$, each of which is provided with a ball $g'$, ride on a fixed cam $i$ and are forced downwardly in succession to cause their lower ends to enter the corresponding molds $d$ which have previously been filled with the moldable material by rotating under a spout $j$ fed from a hopper $k$. The plungers $g$ are held depressed by the cam $i$ for the desired period of time and are then allowed to rise again under the action of springs $l$. Pins $m$ on the lower ends of the plungers penetrate the moldable material contained in the molds $d$ during the depression of the plungers and form the required holes in the buttons being molded, these pins also serving to withdraw the molded buttons from the molds $d$ upon the rising of the plungers $g$. The buttons thus withdrawn are forced off from the pins $m$ as the plungers recede upwardly through the lower support $f$, due to the engagement of the slight fin around the edge of each button with the said support, and the buttons, which then fall on to the table $b$, are removed therefrom by a fixed scraper plate $n$ (Fig. 2).

On the right-hand side of Fig. 1 a mold $d$ is shown being filled with material from the spout $j$, the corresponding plunger $g$ being in the fully raised position, while on the left-hand side of this figure there is shown a plunger $g$ fully depressed to compress the material in the corresponding mold $d$.

In order to heat the molds during the pressing operation, without giving rise to the disadvantages above referred to, the apparatus which has just been briefly described is enclosed in a chamber within which a substantially uniform elevated temperature is maintained.

The shaft $a$ is carried at its upper and lower ends in bearings $o$ formed centrally of stationary circular end plates $p$ and $q$ between which extends a cylindrical wall $r$ serving, together with the end plates $p$ and $q$, to form a chamber enclosing the table $b$ and the supports $e$ and $f$.

Suitable lugs $s$ formed on the wall $r$ serve to support the shaft $t$ of the worm $h$, which latter extends through an opening in the wall to mesh with the worm wheel on the periphery of the support $c$. Furthermore, the spout $j$ extends through the wall $r$, as will be understood, the hopper $k$ being arranged outside the latter. The cam $i$ is preferably, as shown, secured to the underside of the upper end plate $p$.

Near the lower end plate $q$ the wall $r$ is formed with spaced apertures $u$, adapted to receive electrical heating elements $v$ which are supplied with electric current from an external source through leads connected to terminals $v'$, as will be understood.

By means of these heating elements the required temperature may be produced within the chamber formed by the wall $r$ and end plates $p$ and $q$, the heating elements $v$ preferably projecting freely into the space within the chamber so that the air therein may flow freely around the elements $v$ and thus assist in maintaining a uniform temperature in all parts of the chamber space.

As will be understood, the spout $j$ causes the material which is being fed to the molds, to come into contact with the heated space within the chamber before it reaches the molds. This results in a preliminary heating of the material before it is deposited in the molds, with the result that the gases which are usually freed only after the deposit of material in the molds, are in this apparatus removed from the materials preliminary to the filling of the molds. Synthetic resins and other materials of the nature which the present apparatus is intended to mold contain gases which are ordinarily given off in the presence of heat, and these gases tend to puff and cause defects in the molded products. By preliminarily heating the material in this manner and expelling the gases before the molds are filled, the production of uniform molded articles is possible. Moreover, accuracy as to size and shape in the final product is obtained, since constantly maintaining the molds and dies at a uniform heat within the chamber avoids expansion and contraction of the same which occurs in apparatus wherein the molds leave the heated chamber to be filled.

I claim:

1. Apparatus for use in the manufacture of mold articles from synthetic resins and other moldable materials by the application of heat and pressure, comprising a rotary carrier, a plurality of co-operating molds and plungers mounted on said carrier, means for feeding the material to the molds and means for displacing the plungers relatively to the filled molds in order to subject the material therein to pressure, a chamber enclosing the carrier with its molds and plungers throughout their path of travel on the carrier, and means for producing a substantially uniform elevated temperature within said chamber.

2. Apparatus for use in the manufacture of molded articles from synthetic resins and other moldable materials by the application of heat and pressure, comprising a chamber, means for producing an elevated temperature within said chamber, a rotary carrier, co-operating molds and plungers on said carrier having an endless path of travel enclosed throughout by said chamber, means for relatively moving the molds and plungers, and means for feeding material to the molds within the chamber.

3. Apparatus for use in the manufacture of molded articles from synthetic resins and other moldable materials by the application of heat and pressure, comprising a chamber, means for producing an elevated temperature within said chamber, a rotary carrier, co-operating molds and plungers on said carrier having an endless path of travel enclosed throughout by said chamber, means for relatively moving the molds and plungers, means for feeding material to the molds within the chamber, and means within the chamber for removing molded articles from the molds and carrier.

In testimony whereof he has affixed his signature.

MAURICE MICHAEL EATON.